(12) United States Patent
Venkatachalam et al.

(10) Patent No.: US 9,877,139 B2
(45) Date of Patent: Jan. 23, 2018

(54) DEVICE TO DEVICE (D2D) COMMUNICATION MECHANISMS

(75) Inventors: Muthaiah Venkatachalam, Beaverton, OR (US); Puneet Jain, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 454 days.

(21) Appl. No.: 13/997,228

(22) PCT Filed: May 17, 2012

(86) PCT No.: PCT/US2012/038286
§ 371 (c)(1),
(2), (4) Date: Apr. 21, 2014

(87) PCT Pub. No.: WO2013/052163
PCT Pub. Date: Apr. 11, 2013

(65) Prior Publication Data
US 2015/0036495 A1     Feb. 5, 2015

Related U.S. Application Data

(60) Provisional application No. 61/542,726, filed on Oct. 3, 2011.

(51) Int. Cl.
*H04W 4/00* (2009.01)
*H04W 28/02* (2009.01)
(Continued)

(52) U.S. Cl.
CPC ....... *H04W 4/005* (2013.01); *H04W 28/0215* (2013.01); *H04W 28/0247* (2013.01);
(Continued)

(58) Field of Classification Search
CPC .................................................... H04W 4/005
See application file for complete search history.

(56) References Cited

U.S. PATENT DOCUMENTS 8,514,756 B1 *   8/2013   Ramachandra ..... H04L 61/2069
                                                          370/310
8,514,809 B2 *   8/2013   Hwang ............ H04W 36/0022
                                                          370/331
(Continued)

FOREIGN PATENT DOCUMENTS

CN   101772199 A    7/2010
EP    1333627 A1    8/2003
(Continued)

OTHER PUBLICATIONS

Doppler et al, "Device-to-Device Communications as an Underlay to LTE-Advanced Networks", Communications Magazine, IEEE, Dec. 2009, pp. 42-49, vol. 47, Issue 12.
(Continued)

*Primary Examiner* — Andrew Lai
*Assistant Examiner* — Andrew C Lee
(74) *Attorney, Agent, or Firm* — Thorpe North & Western

(57) ABSTRACT

Technology for enabling device-to-device (D2D) communication in a wireless network is disclosed. One method comprises receiving a traffic flow optimization message at a first transmission node in the wireless network from a detection function (DF) module. A D2D setup message can be transmitted from the first transmission node to establish a D2D link, wherein the D2D link bypasses a serving gateway for the wireless network and provides communication between a first wireless device and a second wireless device.

27 Claims, 9 Drawing Sheets

(51) Int. Cl.
*H04W 88/16* (2009.01)
*H04W 48/06* (2009.01)

(52) U.S. Cl.
CPC ....... *H04W 28/0289* (2013.01); *H04W 48/06* (2013.01); *H04W 88/16* (2013.01)

(56) References Cited

U.S. PATENT DOCUMENTS

| | | | | |
|---|---|---|---|---|
| 8,605,655 | B1* | 12/2013 | Sahai | H04M 15/66 370/328 |
| 8,665,792 | B2* | 3/2014 | Perras | H04W 76/022 370/328 |
| 2009/0270099 | A1* | 10/2009 | Gallagher | H04W 8/08 455/435.1 |
| 2009/0316904 | A1* | 12/2009 | Klingenbrunn | H04L 47/10 380/274 |
| 2010/0009675 | A1 | 1/2010 | Wijting et al. | |
| 2010/0093364 | A1* | 4/2010 | Ribeiro | H04W 72/082 455/452.2 |
| 2010/0144357 | A1 | 6/2010 | Chaudhri et al. | |
| 2010/0165882 | A1 | 7/2010 | Palanki et al. | |
| 2011/0075557 | A1* | 3/2011 | Chowdhury | H04L 12/14 370/230 |
| 2011/0176499 | A1* | 7/2011 | Siomina | G01S 1/042 370/329 |
| 2011/0182280 | A1 | 7/2011 | Charbit et al. | |
| 2011/0228750 | A1* | 9/2011 | Tomici | H04W 8/082 370/338 |
| 2011/0267980 | A1* | 11/2011 | Calippe | H04W 24/02 370/254 |
| 2011/0268007 | A1* | 11/2011 | Barany | H04B 7/024 370/312 |
| 2011/0305183 | A1* | 12/2011 | Hsu | H04W 72/005 370/312 |
| 2012/0044949 | A1* | 2/2012 | Velev | H04W 8/082 370/401 |
| 2012/0071168 | A1* | 3/2012 | Tomici | H04W 76/025 455/445 |
| 2012/0082091 | A1* | 4/2012 | Siomina | H04W 4/02 370/328 |
| 2012/0129517 | A1* | 5/2012 | Fox | H04L 41/5025 455/425 |
| 2012/0184290 | A1* | 7/2012 | Kazmi | G01S 5/0242 455/456.1 |
| 2012/0264443 | A1* | 10/2012 | Ng | H04W 4/005 455/450 |
| 2015/0011182 | A1* | 1/2015 | Goldner | H04M 15/66 455/406 |

FOREIGN PATENT DOCUMENTS

| | | |
|---|---|---|
| JP | 2011-077866 | 4/2011 |
| KR | 10-2011-0078308 | 7/2011 |
| WO | WO 2004/032536 A2 | 4/2004 |
| WO | WO 2010/069400 A1 | 6/2010 |
| WO | 2011/036507 A1 | 3/2011 |
| WO | WO 2011/066409 | 6/2011 |
| WO | WO 2011/116017 | 9/2011 |
| WO | 2013/052163 A1 | 4/2013 |

OTHER PUBLICATIONS

Office Action for Japanese application 2014-533521 dated Mar. 17, 2015, 3 pages including English translation.
Office Action for Korean application 10-2014-7011259 dated May 13, 2015, 4 pages English translation only.
Office Action for Russian application 2014117527 dated Jun. 23, 2015, 10 pages including English translation.
ZTE, "APN Solution of QoS Control for IMS P2P CDS", 3GPP S2-11 3986, Sep. 2011, Section 6.1.4.x, China Mobile.
International Search Report and Written Opinion received for PCT application No. PCT/US2012/038286, dated Oct. 30, 2012, 10 pages.
International Preliminary Report on Patentability and Written Opinion received for PCT Patent Application No. PCT/US2012/038286, dated Apr. 17, 2014, 7 pages.
Office Action received for Russian Patent Application No. 2014117527, dated Aug. 8, 2014, 3 pages of Office Action only.

* cited by examiner

DEVICE TO DEVICE (D2D) COMMUNICATION MECHANISMS

This application claims the benefit of and hereby incorporates by reference U.S. Provisional Patent Application Ser. No. 61/542,726, filed Oct. 3, 2011.

BACKGROUND

The use of wireless communication devices continues to become more ubiquitous in modern societies. The substantial increase in the use of wireless devices is driven, in part, by the devices' increasing abilities. While wireless devices were once used only to communicate voice and text, their ability to display audiovisual presentations has driven the need to be able to transmit and receive pictures, information related to games, television, movies, and so forth.

One way of increasing the amount of data that can be communicated is by relieving potential bottlenecks that may occur in a wireless network. For example, gateways such as serving gateways and packet data network gateways can become strained during high use periods of a wireless network.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
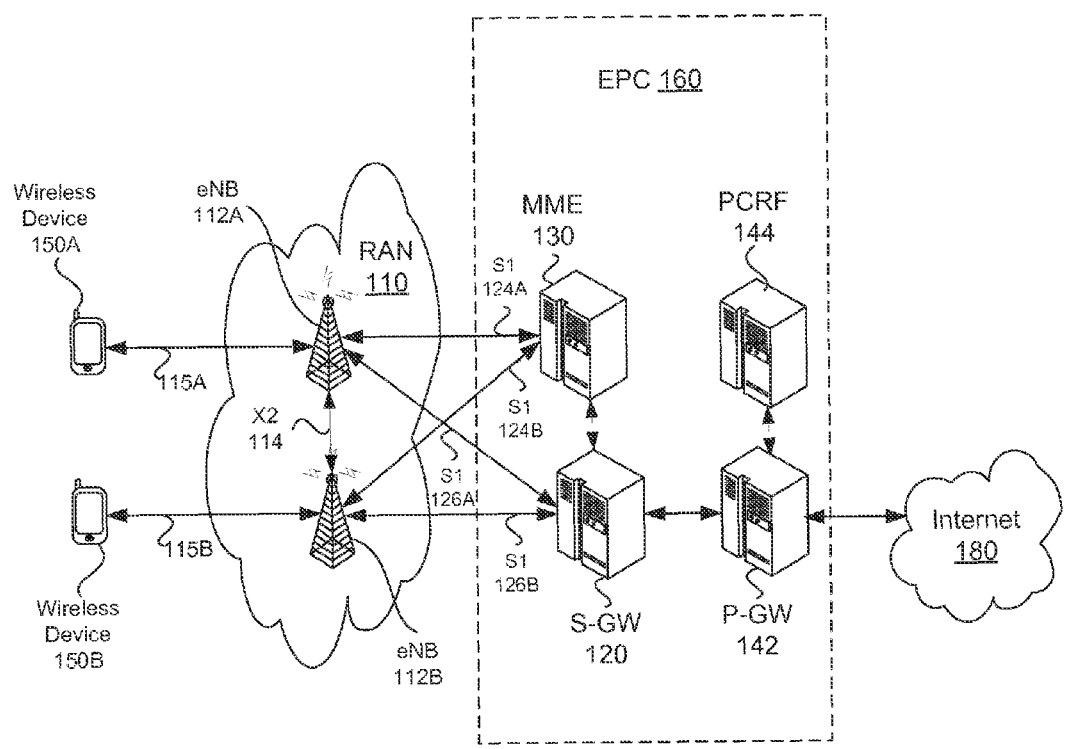
FIG. 1 illustrates a block diagram of a wireless network in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter. The following definitions are provided for clarity of the overview and embodiments described below.

There are many applications that naturally allow device to device (D2D) or peer to peer (P2P) data traffic in the open internet. For example, one application that takes advantage of P2P networking is Skype®. When using Skype, the login, authentication, and billing are routed to a Skype server directly. Post authentication, any data path establishment for any voice or vide calls are done directly between Skype users without being routed via the server. Many other types of messaging applications can also work in this way.

However, when a P2P application such as Skype is initiated between two users in a wireless network, and the users are associated with different wireless transmission nodes in the network, the data path in the network is not optimized for the P2P or D2D traffic. As more and more applications are created that take advantage of P2P and D2D connections, wireless networks can be reconfigured to optimize the data paths for more direct connections between wireless devices. The ability to connect devices in a more direct path can also reduce wireless network bottlenecks that may occur during high traffic periods. In accordance with one embodiment of the present invention, mechanisms are provided to enable various forms of "operator controlled" D2D configurations.

FIG. 1 illustrates an example of one type of wireless network, a third generation partnership project (3GPP) long term evolution (LTE) radio access network (RAN) system. The system operates based on the 3GPP LTE specification, such as releases 8, 9 and 10. While this example is provided, it is not intended to be limiting. Other wireless networks, such as the Institute of Electrical and Electronics Engineers (IEEE) 802.16 standard, commonly referred to as WiMAX, and the IEEE 802. 11 standards, commonly referred to as Wi-Fi, may also be reconfigured to allow more direct connections between wireless devices configure to operate in their respective networks. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), and the 802.11n standard released in 2009 for communication in the 2.4 GHz and 5 GHz bands using multiple-input multiple-output (IMMO).

Standards such as WiFi or Bluetooth are used to provide wireless local area networks (WLAN) that can be accessed by dual mode devices that are also capable of accessing a cellular networking standard such as WiMAX (worldwide interoperability for microwave access), and 3GPP. Releases of the IEEE 802.16 standard include the IEEE 802.16e-2005, 802.16-2009, and 802.16m-2011. Releases of the 3GPP standard include the 3GPP LTE, Release 8 in the fourth quarter of 2008 and 3GPP LTE Advanced Release 10 in the first quarter of 2011.

For 3GPP LTE, the RAN 110 illustrated in FIG. 1 can include transmission nodes such as the evolved universal terrestrial radio access (E-UTRAN or eUTRAN) or UTRAN modules, represented as the eNodeBs 112A and 112B. The RAN can be in communication with an evolved packet core (EPC) module. The EPC can include a serving gateway (S-GW) and a mobility management entity (MME) 130. The EPC can also include a packet data network (PDN) gateway (P-GW) 142 to couple the S-GW to a PDN, such as the Internet 180, an intra-net, or other similar network. The S-GW can provide P2P Internet network access and standard network access for the mobile devices associated with the RAN. The S-GW and MME can be in direct communication with each other via cabling, wire, optical fiber, and/or transmission hardware, such a router or repeater. The eNodeBs 112A-B can be connected to the wireless devices 150A-B via an LTE radio link 115 A-B, respectively. A backhaul link 114, such as an X2 link, can be used to connect the eNBs. The X2 link is typically formed over a broadband wired or optical connection between the eNBs. Connections between the eNBs 112A-B, the S-GW 120, and the MME 130 can be made via S1 type connections 124A-B, and 126A-B. The S1 interface is described in 3GPP Technical Specification (TS) 36.410 versions 8 (2008-12-11), 9 (2009-12-10) and 10 (2011-03-23), which are available to the public.

The EPC 160 can also include a policy and charging rules function (PCRF) node 144 that can be used to determine, in near real time, policy rules in the wireless network. The PCRF node can access subscriber databases and other specialized functions, such as charging systems, as can be appreciated. Additional policies can be added to identify, in near real time, when an operator can configure a network to form a D2D connection between at least two wireless devices. As used herein, an operator is a wireless network service provider. The wireless devices may both be in the operator's network. Alternatively, one of the wireless devices may operate in another operator's network.

Figure 2:
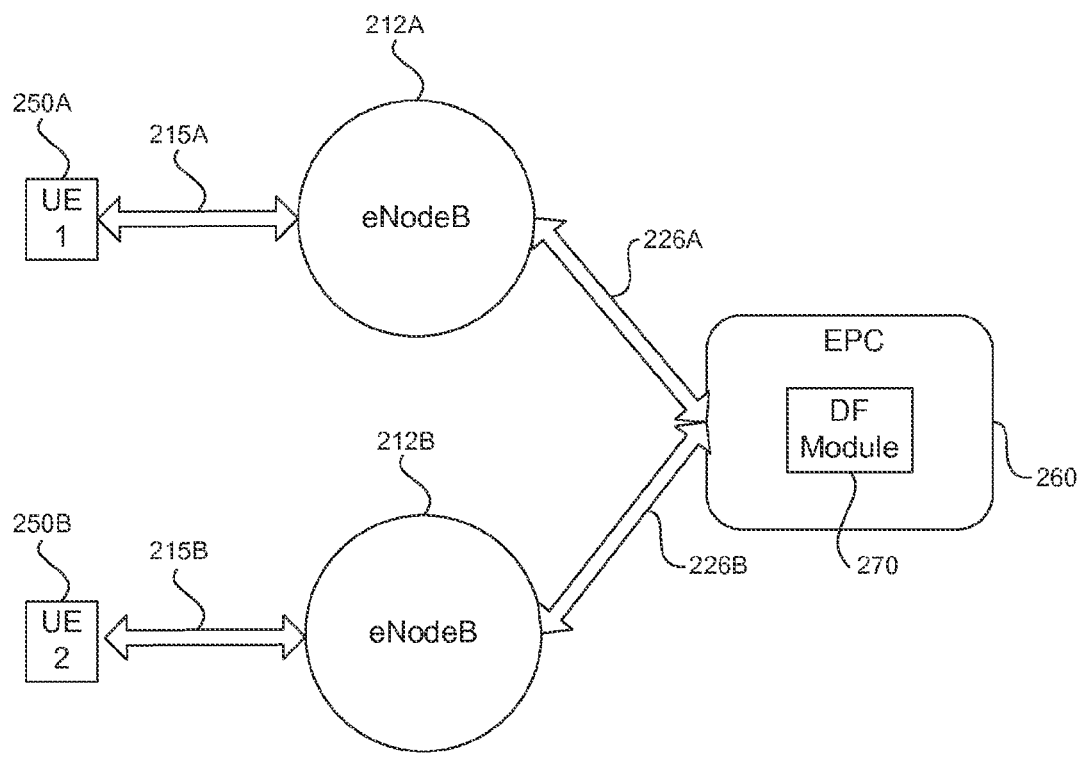
FIG. 2 illustrates a simplified block diagram of a wireless network in accordance with an example.

FIG. 2 provides a simplified view of the wireless network of FIG. 1 showing a typical data path in a communication between a first UE 250A and a second UE 250B. In this example, an LTE radio link 215A (i.e. a radio link based on the 3GPP LTE specification Ver. 8/9/10) is formed between the first UE 250A and an eNodeB 212A. The data is then communicated from the eNodeB 212A to the EPC 260 via an S1 connection 226A, where it can be communicated to, and controlled through, the S-GW, P-GW, MME, and so forth. The data is then routed to the eNodeB 212B that is associated with a second UE (UE2) 250B. The data is routed to the eNodeB via an S1 connection 226B. The data is then routed by the eNodeB to UE2 via an LTE radio link 215B.

For P2P or D2D type connections, the use of the EPC 260 may be inefficient. Moreover, many types of P2P and D2D connections can involve large data transfers such as video (i.e. Skype), and downloads of large data files. These large data transfers can cause congestion at the EPC. Accordingly, when a P2P or D2D type connection is desired or setup, a more direct data path can be configured. As used herein, the term D2D can include P2P type communication and/or applications configured to operate on a P2P basis.

In one embodiment, the EPC 260 can include a detection function (DF) module 270. While the DF module is illustrated as being a part of the EPC, this is not intended to be limiting. The DF module may also be connected remotely to the EPC via a PDN connected to P-GW. The DF module may reside on, or be in communication with the MME 130, the S-GW 120, the P-GW 142, the PCRF 144, an eNodeB 112A-B, or another entity within the wireless network (FIG. 1). The DF module can also operate as a stand-alone entity. The DF can be used detect traffic to identify when there is D2D congestion in the network. The DF module can also be used to determine when a D2D connection is being setup prior to the formation of the connection. The DF module can also be used to detect a proximity of two or more wireless devices to identify if a D2D connection can be setup.

For example, the DF module can be configured to perform deep packet inspection of information flowing through the EPC to identify when a D2D connection has been made, based on the flow of the data. The DF module can also be configured to look at the destination IP address of packets traveling through the EPC. If the destination IP address also belongs to the mobile operator network subnet, then the traffic may be from a P2P application running between two users in the same network.

In another example, the DF can be configured to look at the radio access network (RAN) and core network (CN) bearers. If the gateway in the data path is routing the packet from one uplink tunnel on a given interface, such as an S1 or S5 interface, to another downlink tunnel on the same interface in the same network, then one or more of the IP flows on this tunnel can be deemed to carry D2D traffic.

The DF can also identify if a D2D connection can be made based on location information. For example, the cell IDs of the UEs involved in a D2D communication can be identified. If two UEs are in the same or nearby cells, a D2D connection may be able to be established to reduce congestion in the EPC.

Other mechanisms can also be used for D2D proximity detection. These include UE location identification via a global positioning satellite (GPS) receiver, uplink time difference of arrival (UTDOA), via physical scanning by the UE of nearby access points, or other mechanisms, as can be appreciated.

For any given internet protocol (IP) data flow between two UEs, a D2D connection can be established either at the start of a given IP flow session, or during the IP flow session. The data flow path for a D2D connection between wireless devices can be optimized to reduce overhead, increase data rates, and reduce network congestion.

Figure 3:
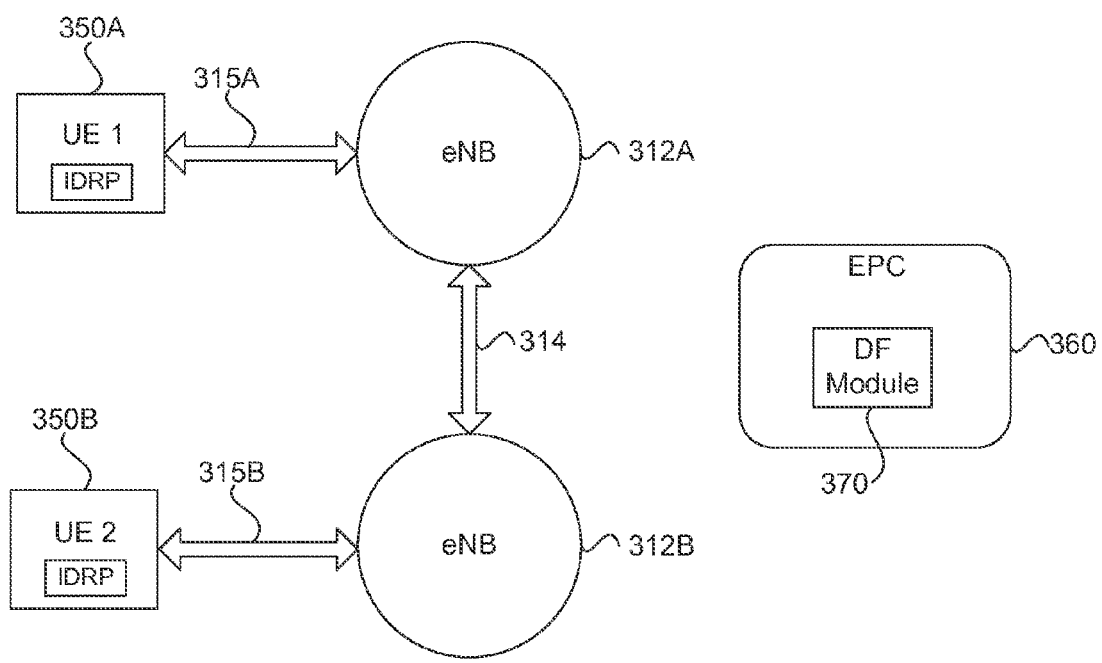
FIG. 3 illustrates a block diagram of a wireless network with a wireless data path for a device to device (D2D) connection in accordance with an example.

FIG. 3 illustrates one example of an optimized wireless data path for a D2D connection that uses minimal infrastructure. Data can be communicated from a first UE 350A to the eNodeB 312A for the cell in which the UE is located via an LTE radio link 315A. The data can then be routed directly to another eNodeB 312B and directed to a desired UE 350B via an LTE radio link 315B. The direct routing between the eNodeBs can be performed via a backhaul link 314. This will be discussed more fully below.

In the example of FIG. 3, the use of the eNodeBs in the optimized wireless data path for a D2D connection allows connections over a greater distance than is possible when connecting two UEs directly together. By eliminating the path through the EPC 320, overhead can be reduced and congestion in the EPC can be decreased.

D2D setup can be triggered either by a UE or by the network. One example to setup a D2D data path, as illustrated in FIG. 3, is provided in the flow diagram of FIG. 4. In one embodiment, a typical wireless connection between two wireless devices may already be setup, as shown by the Initial Data Path in FIG. 4. This typical wireless data path is illustrated in FIG. 2.

Figure 4:
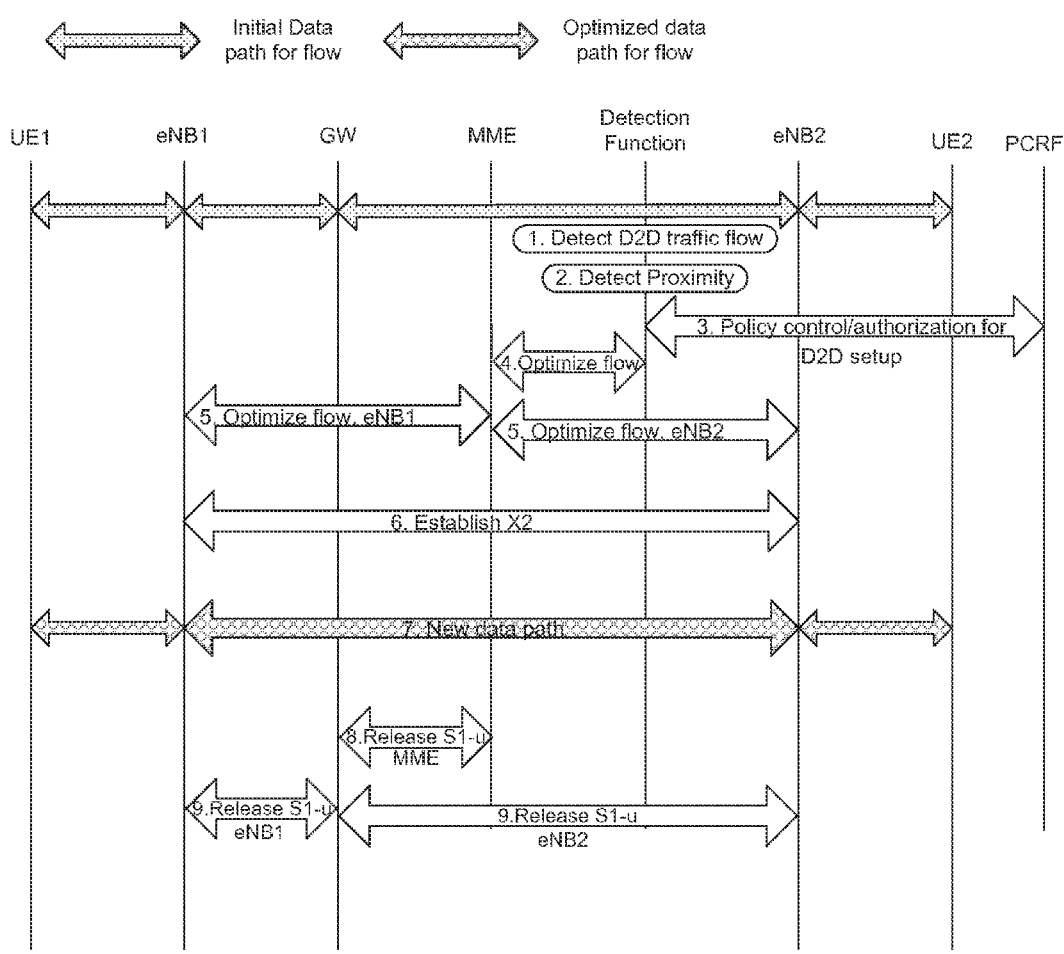
FIG. 4 illustrates a flow diagram for setting up the wireless data path for the D2D connection of FIG. 3 in accordance with an example.

As shown in the flow diagram of FIG. 4, an optimized data path can be created for a D2D connection. In step 1 of the flow diagram, a D2D traffic flow can detected, as previously discussed. In one embodiment, the DF module can be used to detect the D2D traffic flow. The DF module can be in communication with the eNodeB that is associated with the UE setting up or using the D2D connection.

A proximity of the two wireless devices can also be detected, as shown in step 2. It should be noted that the order in which the steps in FIG. 4 are shown are not necessarily the order in which the steps need to be performed. In one embodiment, the DF module can be used to detect the proximity between a location of the first wireless device and a location of a second wireless device with which the D2D connection is to be formed, or has already been formed. Even though the wireless devices may be located in different cells and will still communicate indirectly using eNodeBs, the eNodeBs are connected via a backhaul link 314 (FIG. 3). Thus, for a D2D connection with a path optimization as shown in FIG. 3, the eNodeBs should be located in relatively close proximity.

In one embodiment, the eNodeBs can be part of the same coordinated multi point (CoMP) group. However, any eNodeB that is connected with another eNodeB via a backhaul link can be used to form an optimized data path for two or more D2D devices in communication with the eNodeB(s).

In another embodiment, a single eNodeB may be used to form the D2D optimized data path shown in FIG. 3. For example two UEs may be located on opposite sides of a cell that is anchored by an eNodeB. The eNodeB can be used to effectively relay data from one UE to the other UE to form a D2D connection without the need of the EPC.

In step 3, the DF module can be configured to obtain a policy authorization to setup the D2D traffic flow. The policy authorization may be obtained from a policy and charging rules function (PCRF) module. In one embodiment, the PCRF module can include an inter-device routing policy (IDRP) module. The IDRP module can include information for determining a D2D technology policy, a D2D subscription policy, an application policy, a radio frequency (RF) signal strength policy, or other policies and variables that may need to be accounted for in a D2D connection. Combinations of these policies can also be used. The IDRP module in the PCRF module can communicate with an IDRP module in the UE that is configured to setup the UE to communicate via an operator controlled D2D configuration based on information that is communicated with the IDRF module in the PCRF module.

For example, when selecting a preferable technology for D2D communications, a selection may be made from a number of different communication types, such as LTE, a wireless local area network (WLAN) communication scheme such as the Institute of Electrical and Electronics Engineers (IEEE) 802.11 (Wi-Fi) standard, a transceiver configured to operate based on a Bluetooth® standard, and so forth. The type of communication scheme selected may be based on the type of application being used in the D2D link. For instance, in an internet protocol (IP) flow, such as a video call, the technology selected may be WLAN or LTE, while lower bandwidth or shorter range communications such as Bluetooth may not be selected.

Another IDRP policy can include creating a D2D connection based on a device subscription. For example, a user may have to pay an additional amount to a mobile network operator (MNO) to be allowed to create a D2D connection. Policies may also be set based on the type of MNO. One MNO may not allow their users to create a D2D connection with users of another MNO.

Another example of an IDRP policy is determining whether to setup a D2D connection based on an application type. For instance, certain applications, such as Skype, may be allowed to form a D2D connection, while other applications, such as file sharing, maybe restricted based on policy selections by the MNO.

An additional IDRP policy may be based on RF signal strength. As previously discussed. For example, a D2D connection may be allowed if a wireless device has an RF signal strength over a particular threshold value. The signal strength policy can be useful for direct device to device connections, which will be discussed more fully with respect to FIGS. 5 and 6.

Returning to FIG. 4, step 4 can involve communicating a traffic flow optimization message from the OF module to an MME node in the EPC. The MME module may reply with an acknowledgement message to the OF module. In step 5, the MME node can then transmit a traffic flow optimization message to the two eNodeBs that are associated with the UEs forming the D2D connection. Each eNodeB can reply with an acknowledgement message. The flow optimization message can instruct each eNodeB to initiate a setup of a D2D link between the eNodeB, thereby bypassing the S-GW and/or other network components within the EPC.

Accordingly, in step 6, a backhaul link, such as an X2 link, can be formed between the eNodeBs that are associated with the UEs forming the D2D connection. For example, as shown in FIG. 4, a first eNodeB may send an X2 establishment request to the second eNodeB upon reception of the optimize flow message from the MME. The second eNodeB can then send an acknowledgement back to the first eNodeB.

In step 7, a new D2D data path can be formed, in which data can be communicated between a first UE and a second UE via a radio link between the UEs and their respective eNodeBs, and a D2D link can be formed over the backhaul link, such as the X2 connection between the two eNodeBs to complete the optimized D2D data path.

Once the new data path has been formed, the initial data path can be released. In the example in FIG. 4, a release S1-u connection can be sent from the MME to the gateway (i.e. S-GW) and an acknowledgment can be returned. The gateway can then send a release S1-u message to each eNodeB, and an acknowledgement received from the respective eNodeBs. Upon release of the initial data path (i.e. FIG. 2), the new optimized data path for D2D (i.e. FIG. 3) can be solely responsible for communicating data between two devices without the assistance of network devices in the EPC such as the S-GW, thereby reducing network congestion.

Figure 5:
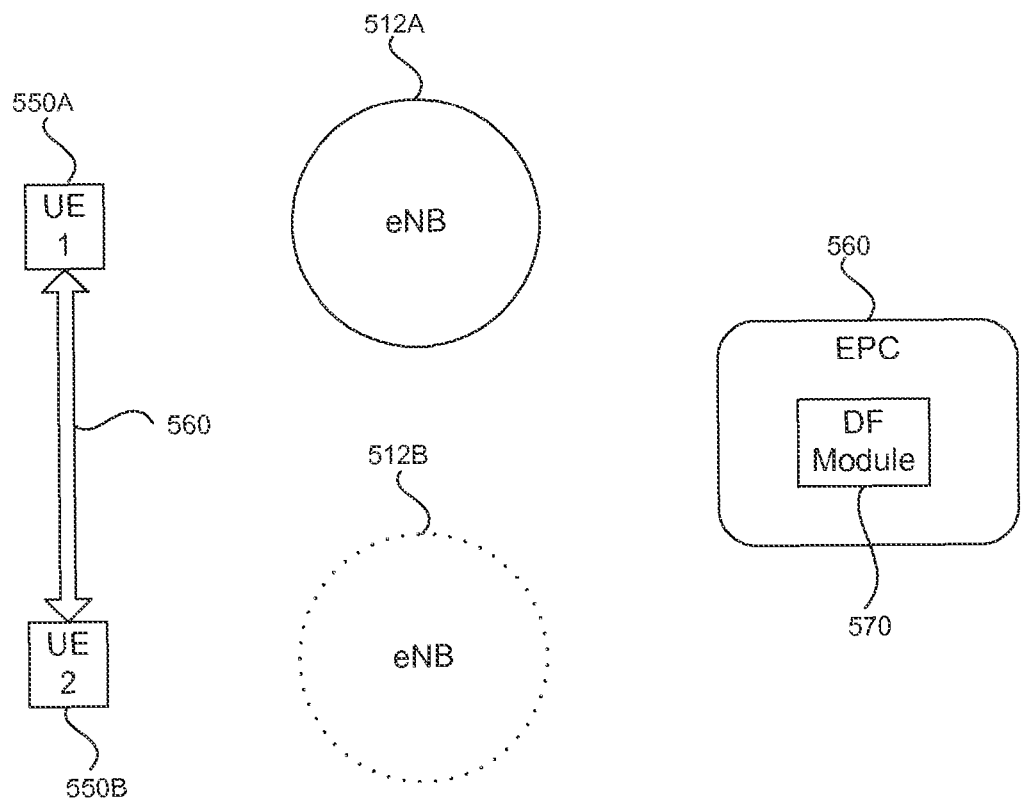
FIG. 5 illustrates a block diagram of a wireless network with an additional wireless data path for a D2D connection in accordance with an example.

FIG. 5 provides another example of an optimized data path for D2D communication. In this example, a first and second UE 550A-B can be configured to setup a data path 560 directly between the UEs. This effectively reduces network congestion at both the EPC 520 and the eNodeBs 512A-B. In addition, depending on the location of the UEs, it can also reduce battery usage and increase data transfer speeds, since the location between the UEs may be significantly shorter than the distance from the UE to each respective eNB.

As in FIG. 3, while two eNodeBs 512A-B are illustrated in FIG. 5, a D2D connection may be setup for two wireless devices, such as UEs 550A-B that are operating in the same cell and assigned to the same eNodeB. Accordingly, the second eNodeB 512B is shown using a dotted line, illustrating that it can be optional.

Figure 6:
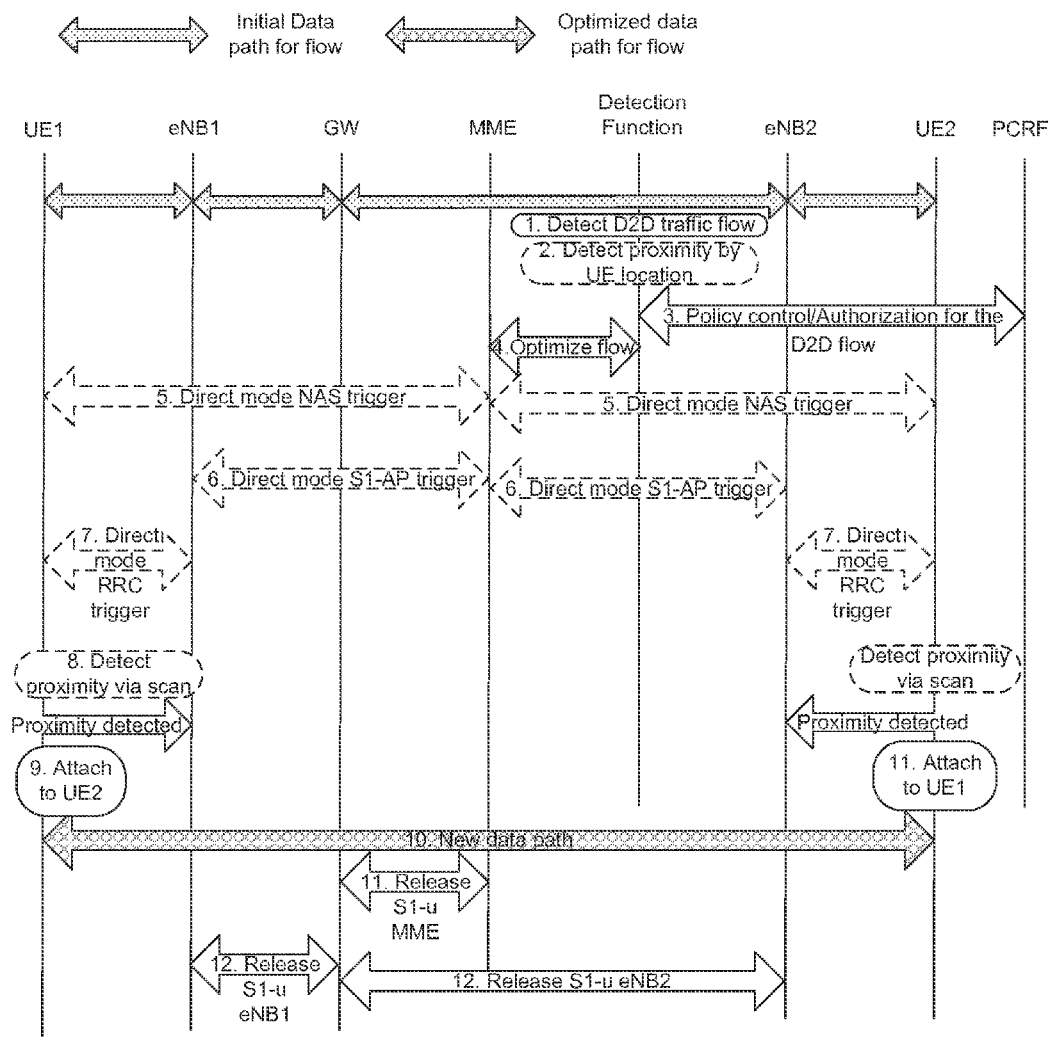
FIG. 6 illustrates a flow diagram for setting up the wireless data path for the D2D connection of FIG. 4 in accordance with an example.

One example to setup an optimized D2D data path, as illustrated in FIG. 5, is provided in the flow diagram of FIG. 6. An initial data path, as shown in FIG. 2, is illustrated at the top of the flow diagram. Steps 1-4 are substantially similar to the steps in the flow diagram of FIG. 4. These steps involve: (1) the detection of D2D traffic flow; (2) the detection of proximity of UE's based on their locations; (3) policy control and authorization for the D2D traffic flow; and (4) a flow optimization message communicated from the detection function (OF) module to the MME to initiate setup of the optimized data path, as shown in FIG. 5. These steps have previously been described in detail and also apply to the initial setup of the optimized data path illustrated in FIGS. 5 and 6. It should be noted that step 2 in the flow diagram of FIG. 6 is optional. The detection of proximity may be accomplished in FIG. 8, as will be discussed in the proceeding paragraphs.

In step 5 of FIG. 6, a direct mode non-access stratum (NAS) message is communicated from the MME node to the first and second wireless devices, such as UEs. The direct mode NAS message provides an initialization message for a 020 link to the first and second UEs. Each UE can then send an acknowledgment message to the MME. In step 6, a direct mode S1-application protocol (AP) trigger message is sent from the MME to the first and second eNodeBs. The S1-AP message provides an initialization message to the eNodeBs instructing them to instruct the UEs to setup a D2D link between the UEs via an S1 interface. The eNodeBs can each send an acknowledgment message back to the MME acknowledging that the S1-AP message was received.

Accordingly, in step 7 the first and second eNodeBs send a direct mode radio resource control (RRC) trigger to the first and second UE. The direct mode RRC trigger message can instruct the first UE to establish a direct D2D link with the second UE. An acknowledgment message is sent from each UE to each respective eNodeB. It should be noted that if there is a single eNodeB, the single eNodeB could communicate the RRC trigger message to two or more UEs instructing them to setup a D2D connection.

In step 8 of FIG. 6, a proximity of the first and second UEs can be accomplished. The proximity of each UE may be determined based on a scan. The proximity scan can occur via the LTE interface between each UE and the respective eNodeB. Alternatively, the proximity scan may be accomplished using alternate technologies, such as Wi-Fi or Bluetooth. A proximity detection message may be communicated from each UE to each eNodeB, as shown in FIG. 6.

In steps 9-11, UE1 can attach to UE2 to form a new data path directly between the UEs. The formation of the new data path can depend on various policies that may be set forth based on IDRP, as previously discussed. For instance, the new data path described with respect to FIGS. 5 and 6 may be setup depending on the RF signal power between the two wireless devices. The signal power may depend on the wireless devices proximate locations to one another (i.e. the distance between the devices), the characteristics of each wireless device (i.e. antenna size, number of antennas, amplifier power, low noise amplifier type), and so forth.

As previously discussed, the new data path may be formed using a licensed or unlicensed portion of the spectrum. A licensed portion of the spectrum includes wireless bands that are licensed for use by a public or private entity. The new data path may be implemented using the same licensed spectrum as the initial data path. Alternatively, the data path may be formed using an unlicensed portion of the spectrum, such as the ISM band. For instance, the new data path 10 may be formed via a Wi-Fi connection. The Wi-Fi connection may be a connection based on the IEEE 802.11a, 802.11b, 802.11g, 802.11n, and 802.11ac specifications. A draft of the 802.11ac specification was released in November, 2011. The Wi-Fi connection may also be based on additional types of Wi-Fi standards. This list is not intended to be limiting.

Once the new data path has been formed, the initial data path can be released. In the example in FIG. 6, a release S1-u connection can be sent from the MME to the gateway (i.e. S-GW) and an acknowledgment can be returned. The gateway can then send a release S1-u message to each eNodeB, and an acknowledgment received from the respective eNodeBs. Upon release of the initial data path (i.e. FIG. 2), the new optimized data path for D2D (i.e. FIG. 5) can be solely responsible for communicating data between two devices without the assistance of the eNodeBs or network devices in the EPC such as the S-GW, thereby reducing network congestion in the EPC and at each eNodeB.

An Access network discovery and selection function (ANDSF) is an entity within the EPC. The purpose of the ANDSF is to assist a UE to discover non-3GPP access networks, such as Wi-Fi or IEEE 802.16, commonly referred to as WIMAX. The non-3GPP access networks can be used for data communications in addition to 3GPP access networks. The IDRT policies that were previously discussed can be used to assist in the setup of optimized data paths for D2D communication, such as the data paths illustrated in the examples of FIGS. 3 and 5.

In one example, a transmission node for enabling device-to-device (D2D) communication in a wireless network is disclosed. The transmission node may be an eNodeB. Alternatively, the transmission node may be another type of wireless access point. The transmission node is configured to receive a traffic flow optimization message from a detection function module and transmit a D2D setup message to establish a D2D link. The detection function node can communicate the traffic flow optimization message to a mobility management entity (MME) node. The MME node may then communicate the traffic flow optimization message to the transmission node. The D2D link that can be created based on the D2D setup message can bypass a serving gateway for the wireless network and provides direct communication between a first wireless device and a second wireless device.

In one embodiment, the transmission node that is configured to transmit the D2D setup message to establish the D2D link is further configured to establish a backhaul link between the transmission node and a second transmission node in the wireless network. The D2D link can include the backhaul link. The transmission node can be further configured to communicate directly between the first transmission node and a second transmission node via the backhaul link bypassing the serving gateway (SGW) for the D2D communication. The first wireless device can be in communication with the transmission node and the second wireless device can be in communication with the second transmission node.

The transmission node that is configured to receive a traffic flow optimization message can be further configured to receive a direct mode S1-application protocol (S1-AP) trigger message. The traffic flow optimization message can include the direct mode S1-AP trigger message. The transmission node that is configured transmit the D2D setup message to establish the D2D link can be further configured to transmit a direct mode radio resource control (RRC) trigger message to the first wireless device. The D2D setup message can include the direct mode radio RRC trigger message. The direct mode RRC trigger message can instruct the first wireless device to establish a direct D2D link between the first wireless device and the second wireless device, thereby bypassing the serving gateway (SGW) and the transmission node for the D2D communication.

The transmission node can be further configured to receive a bearer release message from the SGW. The bearer release message can instruct the transmission node to cease use of a network link via the SGW for the D2D communication. In one embodiment, the transmission node can receive a proximity detection message from the first wireless device including the second wireless device location.

The transmission node can be selected from the group consisting of an evolved Node B (eNodeB), a base station (BS), a base band unit (BBU), a wireless access point (WAP), and combinations thereof. The wireless network can be selected from the group consisting of an operator network, a licensed band network, an unlicensed band network, a wireless wide area network (WWAN), a wireless local area network (WLAN), a wireless personal area network (WPAN), and combinations thereof.

The first wireless device and the second wireless device can selected from the group consisting of a user equipment (UE) and a mobile station (MS). The wireless devices can be configured to connect to an operator network, a licensed band network, an unlicensed band network, a wireless wide area network (WWAN), a wireless local area network (WLAN), or a wireless personal area network (WPAN). In one embodiment, the wireless devices can include at least one of an antenna, a touch sensitive display screen, a speaker, a microphone, a graphics processor, an application processor, internal memory, a non-volatile memory port, or combinations thereof.

In another embodiment, a mobility management entity (MME) node for enabling device-to-device (D2D) communication in a wireless network is disclosed. The MME node is configured to receive a traffic flow optimization message from a detection function (DF) module. The MME is further configured to transmit a traffic flow optimization message to a first transmission node in the wireless network. The traffic flow optimization message can initiates a setup of a D2D link between a first wireless device and a second wireless device, thereby bypassing a serving gateway (SGW) for the D2D communication. The D2D link between the first and second wireless devices can be formed using either licensed bands or unlicensed bands, as can be appreciated. For example, the D2D link may be formed via a licensed band, such as a band used by a 3GPP LTE network operator. Alternatively, the D2D link may be formed via an unlicensed band, such as a band used in communication in the IEEE 802.11 specification or another band in the industrial, scientific, and medical (ISM) bands. In another embodiment, both licensed bands and unlicensed bands may be aggregated together by one or more of the wireless devices to provide increased additional bandwidth.

The traffic flow optimization message can instruct the first transmission node to: establish a backhaul link between the first transmission node and a second transmission node in the wireless network, wherein the D2D link includes the backhaul link; and communicate directly with a second transmission node via the backhaul link bypassing the serving gateway (SGW) for the D2D communication. The first wireless device can be in communication with the transmission node, and the second wireless device can be in communication with the second transmission node.

The MME node can be further configured to transmit a direct mode non-access stratum (NAS) message to the first wireless device. The direct mode NAS message can provides an initialization message for a D2D link to the first wireless device through the NAS layer. The MME node can transmit a direct mode S1-application protocol (S1-AP) trigger message. The traffic flow optimization message can include the direct mode S1-AP message. The direct mode S1-AP message can provide an initialization message to the first transmission node to setup a D2D link via an S1 interface. The direct mode NAS message and the direct mode S1-AP message can instruct the first wireless device to establish a direct D2D link between the first wireless device and the second wireless device, thereby bypassing the serving gateway (SGW) and the transmission nodes for the D2D communication.

The MME node can be further configured to receive a bearer release message from the SGW. The bearer release message can instruct the MME node to cease use of a network link via the SGW for the D2D communication.

Figure 7:
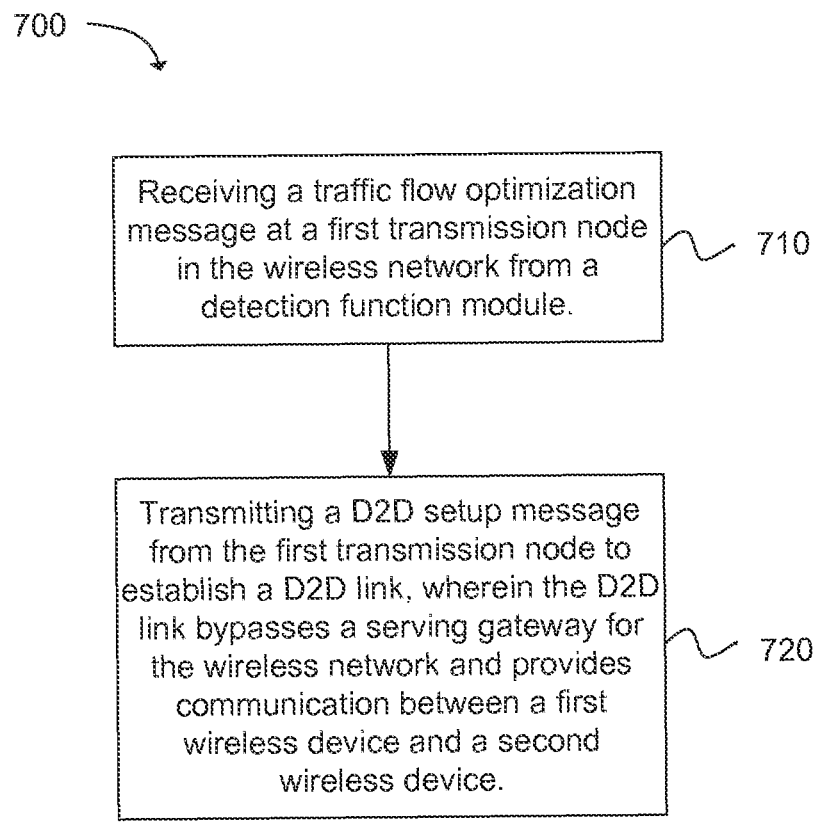
FIG. 7 depicts a flow chart for enabling device-to-device (D2D) communication in a wireless network at a transmission node in accordance with an example.

Another example provides a method 700 for enabling device-to-device (D2D) communication in a wireless network, as shown in the flow chart in FIG. 7. The method may be executed as instructions on a machine, where the instructions are included on at least one computer readable medium. A transmission node can be configured to execute the method. The method includes the operation of receiving a traffic flow optimization message at a first transmission node in the wireless network from a detection function module, as in block 710. The detection function module may communicate the traffic flow optimization message to a mobility management entity (MME) node. The operation of transmit a D2D setup message from the first transmission node to establish a D2D link, wherein the D2D link bypasses a serving gateway for the wireless network and provides communication between a first wireless device and a second wireless device follows, as in block 720.

In one embodiment, establishing the D2D link can further include an instruction to establish a backhaul link between the first transmission node and a second transmission node in the wireless network. The D2D link can include the backhaul link. Establishing the D2D link can also an instruction to communicate directly between the first transmission node and a second transmission node via the backhaul link bypassing the serving gateway (SGW) for the D2D communication. The first wireless device can be in communication with the first transmission node and the second wireless device can be in communication with the second transmission node.

The operation of receiving a traffic flow optimization message can further include an instruction to receive a direct mode S1-application protocol (S1-AP) trigger message. The instruction to transmit the D2D setup message from the first transmission node to establish the D2D link can further include an instruction to transmit a direct mode radio resource control (RRC) trigger message from the first transmission node to the first wireless device. The direct mode RRC trigger message can instruct the first wireless device to establish a direct D2D link between the first wireless device and the second wireless device bypassing the serving gateway (SGW) and the first transmission node for the D2D communication.

The method 700 can also include the operation of receiving a bearer release message at the first transmission node from the SGW. The bearer release message can instruct the first transmission node to cease use of a network link via the SGW for the D2D communication. A further operation involves receiving a proximity detection message at the first transmission node from the first wireless device including the second wireless device location relative to a first wireless device location.

Another operation of the method 700 can include detecting a D2D traffic flow at a detection function (DF) module in communication with the first transmission node prior to the instruction to receive the traffic flow optimization message; detect a proximity between a first wireless device location and a second wireless device location at the detection function module; obtain a policy authorization for the D2D traffic flow at the detection function module from a policy and charging rules function (PCRF) module; and transmit a traffic flow optimization message from the detection function module to a mobility management entity (MME) node.

The instruction to detect the proximity between the first wireless device location and the second wireless device location can further include an instruction to determine the first wireless device location and the second wireless device location via a global positioning system (GPS), an uplink time difference of arrival (UTDOA), a cell identification (ID) number, or combinations thereof.

The method 700 can further comprise detecting a D2D traffic flow at a detection function (DF) module in communication with the first transmission node prior to the instruction to receive the traffic flow optimization message; obtaining a policy authorization for the D2D traffic flow at the detection function module from a policy and charging rules function (PCRF) module; receiving proximity detection message at the first transmission node from the first wireless device including the second wireless device location relative to a first wireless device location; and transmitting a traffic flow optimization message from the detection function module to a mobility management entity (MME) node.

The policy authorization can include an inter-device routing policy (IDRP) selected from the group consisting of a policy selecting a standard for D2D communication, a policy selecting D2D communication based on wireless device subscription, a policy selecting D2D communication based on an application type, a policy selecting D2D communication based on a radio frequency (RF) signal strength, and combinations thereof.

The method 700 can further include proximity detection procedures including: deep packet inspection of an application type for the D2D traffic flow; comparison of a cell identification (ID) number for the first wireless device and a cell ID number for the second wireless device; comparison of a mobile operator network subnet of a destination address for the first wireless device and a mobile operator network subnet of a destination address for the second wireless device; and comparison of a radio access network (RAN) and a core network (CN) for the first wireless device and a RAN and a ON for the second wireless device. In one embodiment, the proximity detection message can be generated after physical scanning by the first wireless device or the second wireless device.

Figure 8:
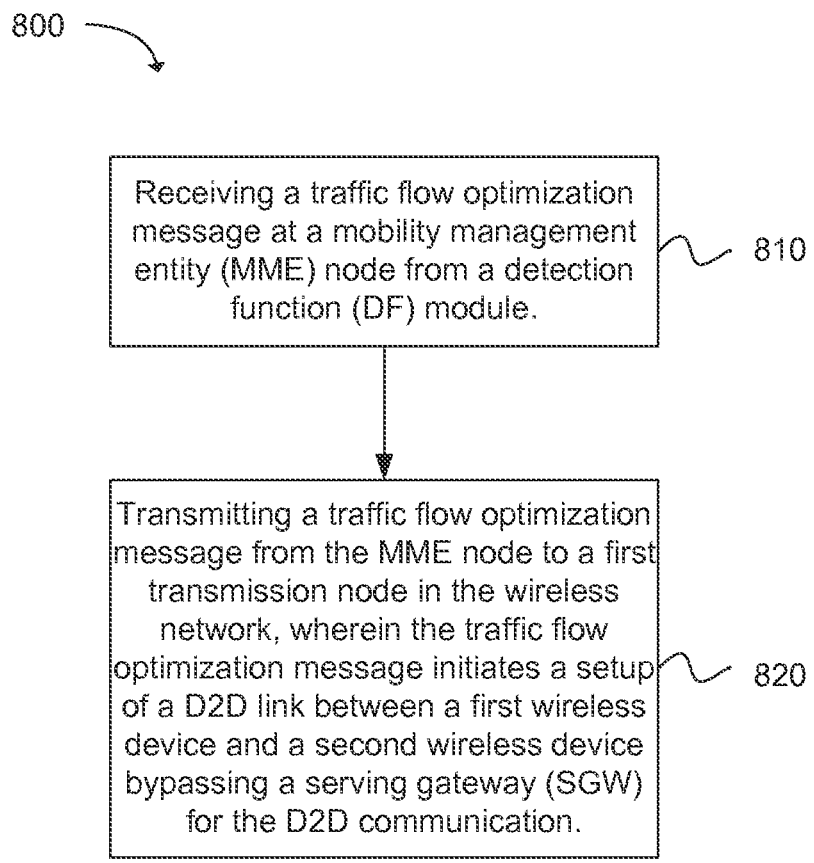
FIG. 8 depicts a flow chart for enabling device-to-device (D2D) communication in a wireless network at a mobility management entity (MME) in accordance with an example.

Another example provides a method 800 for enabling device-to-device (D2D) communication in a wireless network, as shown in the flow chart in FIG. 8. The method may be executed as instructions on a machine, where the instructions are included on at least one computer readable medium. A mobility management entity (MME) node can be configured to execute the method. The method includes the operation of receiving a traffic flow optimization message at a mobility management entity (MME) node from a detection function (DF) module, as in block 810. The operation of transmitting a traffic flow optimization message from the MME node to a first transmission node in the wireless network, wherein the traffic flow optimization message initiates a setup of a D2D link between a first wireless device and a second wireless device bypassing a serving gateway (SGW) for the D2D communication follows, as in block 680.

The method 800 can further comprise instructing the first transmission node to: establish a backhaul link between the first transmission node and a second transmission node in the wireless network, wherein the D2D link includes the backhaul link; and communicate directly between the first transmission node and a second transmission node via the backhaul link bypassing the serving gateway (SGW) for the D2D communication. The first wireless device can be in communication with the first transmission node and the second wireless device can be in communication with the second transmission node.

The method 800 can comprise transmitting a direct mode non-access stratum (NAS) message from the MME node to the first wireless device. The direct mode NAS message can provide an initialization message for a D2D link to the first wireless device through the NAS layer. The instruction to transmit the traffic flow optimization message can further include an instruction to transmit a direct mode St-application protocol (S1-AP) trigger message. The direct mode S1-AP message can provide an initialization message to the first transmission node to setup a D2D link via an S1 interface. The direct mode NAS message and the direct mode S1-AP message can instruct the first wireless device to establish a direct D2D link between the first wireless device and the second wireless device, thereby bypassing the serving gateway (SGW) and the transmission nodes for the D2D communication.

The method 800 can further comprise detecting a D2D traffic flow at the detection function module in communication with the MME node prior to the instruction to receive the traffic flow optimization message; detecting a proximity between a first wireless device location and a second wireless device location at the detection function module; and obtaining policy authorization for the D2D traffic flow at the detection function module from a policy and charging rules function (PCRF) module.

In one embodiment, the instruction to detect the proximity between the first wireless device location and the second wireless device location further includes an instruction to determine the first wireless device location and the second wireless device location via a global positioning system (GPS), an uplink time difference of arrival (UTDOA), a cell identification (ID) number, or combinations thereof.

The method 800 can further comprise detecting a D2D traffic flow at the detection function module in communication with the MME node prior to the instruction to receive the traffic flow optimization message; obtaining policy authorization for the D2D traffic flow at the detection function module from a policy and charging rules function (PCRF) module; and receiving a proximity detection message at the first transmission node from the first wireless device including the second wireless device location relative to a first wireless device location.

The method 800 can also comprise receiving a bearer release message at the MME node from the SGW, wherein the bearer release message instructs the MME node to cease use of a network link via the SGW for the D2D communication.

Figure 9:
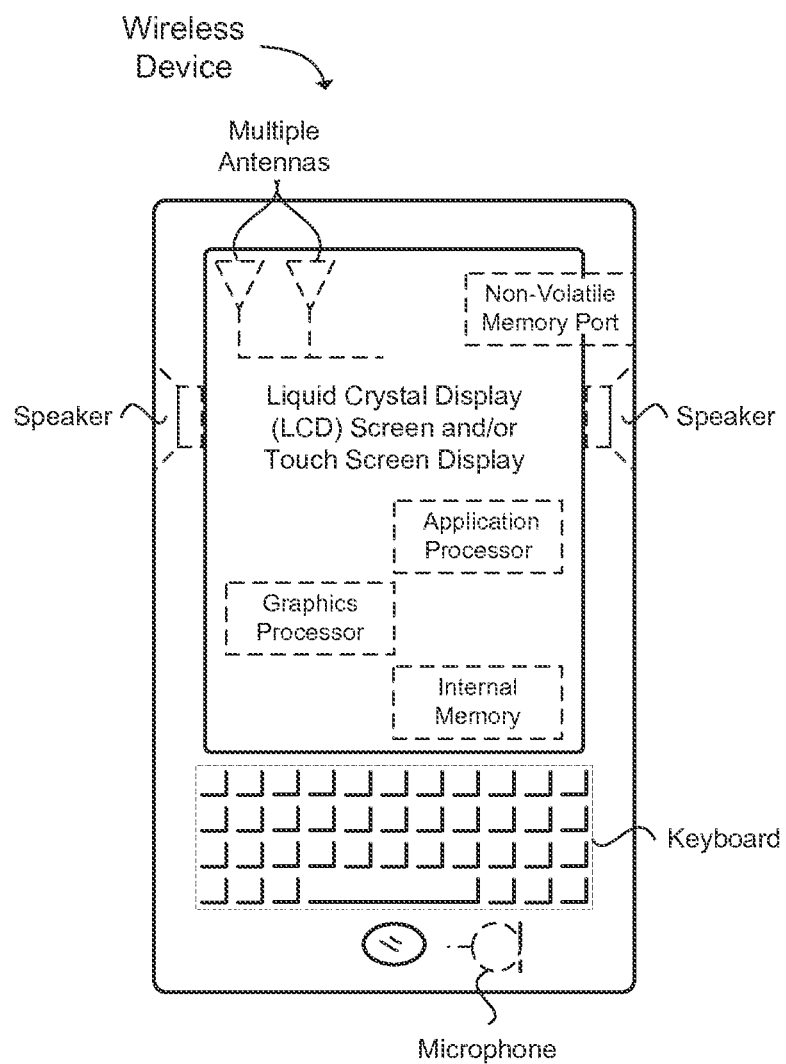
FIG. 9 illustrates a diagram of a wireless device in accordance with an example.

FIG. 9 provides an example illustration of the mobile device, such as a user equipment (UE), a mobile station (MS), a mobile wireless device, a mobile communication device, a tablet, a handset, or other type of mobile wireless device. The mobile device can include one or more antennas configured to communicate with a node, macro node, low power node (LPN), or, transmission station, such as a base station (BS), an evolved Node B (eNB), a base band unit (BBU), a remote radio head (RRH), a remote radio equipment (RRE), a relay station (RS), a radio equipment (RE), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 9 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, or other medium for storing electronic data. The base station and mobile device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. At least one non-transitory computer readable medium having instructions stored thereon for enabling device-to-device (D2D) communication in a wireless network, the instructions when executed on a machine to cause the machine to:
   receive a traffic flow optimization message at a first transmission node in the wireless network from a detection function (DF) module operating in an evolved packet core (EPC), wherein the DF module is stored in a digital memory device or is implemented in a hardware circuit; and
   establish a backhaul link between the first transmission node and a second transmission node in the wireless network, wherein the D2D communication includes the backhaul link: and
   transmit a D2D setup message from the first transmission node to establish a D2D link to provides communication between a first wireless device and a second wireless device via the backhaul link between the first transmission node and the second transmission node, thereby bypassing the serving gateway (SGW) for the D2D communication, wherein the first wireless device is in communication with the first transmission node, and the second wireless device is in communication with the second transmission node.

2. The at least one non-transitory computer readable medium of claim 1, with further instructions to:
   receive a bearer release message at the first transmission node from the SGW, wherein the bearer release message instructs the first transmission node to cease use of a network link via the SGW for the D2D communication.

3. The at least one non-transitory computer readable medium of claim 1, with further instructions to:
   detect a D2D traffic flow at the DF module in communication with the first transmission node prior to the instruction to receive the traffic flow optimization message;
   detect a proximity between a first wireless device location and a second wireless device location at the DF module;
   obtain a policy authorization for the D2D traffic flow at the detection function module from a policy and charging rules function (PCRF) module;
   transmit a traffic flow optimization message from the DF module to a mobility management entity (MME) node; and
   transmit the traffic flow optimization message from the MME node to the first transmission node and the second transmission node.

4. The at least one non-transitory computer readable medium of claim 3, wherein the instruction to detect the proximity between the first wireless device location and the second wireless device location further includes an instruction to determine the first wireless device location and the second wireless device location via a global positioning system (GPS), an uplink time difference of arrival (UTDOA), a cell identification (ID) number, or combinations thereof.

5. The at least one non-transitory computer readable medium of claim 1, wherein the instruction to transmit the D2D setup message from the first transmission node to establish the D2D link further includes instructions to establish the D2D link between the first wireless device and the second wireless device over at least one of a licensed band and an unlicensed band.

6. The at least one non-transitory computer readable medium of claim 1, wherein:
   the instruction to receive a traffic flow optimization message further includes an instruction to receive a direct mode S1-application protocol (S1-AP) trigger message; and
   the instruction to transmit the D2D setup message from the first transmission node to establish the D2D link further includes an instruction to transmit a direct mode radio resource control (RRC) trigger message from the first transmission node to the first wireless device, wherein the direct mode RRC trigger message instructs the first wireless device to establish a direct D2D link between the first wireless device and the second wireless device bypassing the serving gateway (SGW) and the first transmission node for the D2D communication.

7. The at least one non-transitory computer readable medium of claim 6, with further instructions to:
   receive a proximity detection message at the first transmission node from the first wireless device including the second wireless device location relative to a first wireless device location.

8. The at least one non-transitory computer readable medium of claim 6, with further instructions to:
   detect a D2D traffic flow at a detection function (DF) module in communication with the first transmission node prior to the instruction to receive the traffic flow optimization message;
   obtain a policy authorization for the D2D traffic flow at the detection function module from a policy and charging rules function (PCRF) module;
   receive proximity detection message at the first transmission node from the first wireless device including the second wireless device location relative to a first wireless device location; and
   transmit a traffic flow optimization message from the detection function module to a mobility management entity (MME) node.

9. The at least one non-transitory computer readable medium of claim 8, wherein the policy authorization includes an inter-device routing policy (IDRP) selected from a group consisting of a policy selecting a standard for D2D communication, a policy selecting D2D communication based on wireless device subscription, a policy selecting D2D communication based on an application type, a policy selecting D2D communication based on a radio frequency (RF) signal strength, and combinations thereof.

10. The at least one non-transitory computer readable medium of claim 8, wherein the instruction to detect the D2D traffic flow further includes at least one of the following instructions to:
  deep packet inspect an application type for the D2D traffic flow;
  compare a cell identification (ID) number for the first wireless device and a cell ID number for the second wireless device;
  compare a mobile operator network subnet of a destination address for the first wireless device and a mobile operator network subnet of a destination address for the second wireless device; and
  compare a radio access network (RAN) and a core network (CN) for the first wireless device and a RAN and a CN for the second wireless device.

11. The at least one non-transitory computer readable medium of claim 8, wherein the proximity detection message is generated after physical scanning by the first wireless device or the second wireless device.

12. At least one non-transitory computer readable medium having instructions stored thereon for enabling device-to-device (D2D) communication in a wireless network, the instructions when executed on a machine to cause the machine to:
  receive a traffic flow optimization message at a mobility management entity (MME) node from a detection function (DF) module, wherein the DF module is stored in a digital memory device or is implemented in a hardware circuit; and
  transmit the traffic flow optimization message from the MME node to a first transmission node in the wireless network, wherein the traffic flow optimization message initiates a setup of a D2D link between a first wireless device and a second wireless device bypassing a serving gateway (SGW) for the D2D communication.

13. The at least one non-transitory computer readable medium of claim 12, wherein the traffic flow optimization message instructs the first transmission node to:
  establish a backhaul link between the first transmission node and a second transmission node in the wireless network, wherein the D2D link includes the backhaul link; and
  communicate directly between the first transmission node and a second transmission node via the backhaul link bypassing the serving gateway (SGW) for the D2D communication, wherein the first wireless device is in communication with the first transmission node, and the second wireless device is in communication with the second transmission node.

14. The at least one non-transitory computer readable medium of claim 12, with further instructions to:
  transmit a direct mode non-access stratum (NAS) message from the MME node to the first wireless device, wherein the direct mode NAS message provides an initialization message for a D2D link to the first wireless device through the NAS layer;
  wherein the instruction to transmit the traffic flow optimization message further includes an instruction to transmit a direct mode S1-application protocol (S1-AP) trigger message, wherein the direct mode S1-AP message provides an initialization message to the first transmission node to setup a D2D link via an S1 interface;
  wherein the direct mode NAS message and the direct mode S1-AP message instruct the first wireless device to establish a direct D2D link between the first wireless device and the second wireless device, thereby bypassing the serving gateway (SGW) and the transmission nodes for the D2D communication.

15. The at least one non-transitory computer readable medium of claim 12, with further instructions to:
  detect a D2D traffic flow at the detection function module in communication with the MME node prior to the instruction to receive the traffic flow optimization message;
  detect a proximity between a first wireless device location and a second wireless device location at the detection function module; and
  obtain policy authorization for the D2D traffic flow at the detection function module from a policy and charging rules function (PCRF) module.

16. The at least one non-transitory computer readable medium of claim 15, wherein the instruction to detect the proximity between the first wireless device location and the second wireless device location further includes an instruction to determine the first wireless device location and the second wireless device location via a global positioning system (GPS), an uplink time difference of arrival (UT-DOA), a cell identification (ID) number, or combinations thereof.

17. The at least one non-transitory computer readable medium of claim 12, with further instructions to:
  detect a D2D traffic flow at the detection function module in communication with the MME node prior to the instruction to receive the traffic flow optimization message;
  obtain policy authorization for the D2D traffic flow at the detection function module from a policy and charging rules function (PCRF) module; and
  receive proximity detection message at the first transmission node from the first wireless device including the second wireless device location relative to a first wireless device location.

18. The at least one non-transitory computer readable medium of claim 12, with further instructions to:
  receive a bearer release message at the MME node from the SGW, wherein the bearer release message instructs the MME node to cease use of a network link via the SGW for the D2D communication.

19. A transmission node for enabling device-to-device (D2D) communication in a wireless network configured to:
  receive a traffic flow optimization message from a mobility management entity (MME) node;
  establish a backhaul link between the first transmission node and a second transmission node in the wireless network, wherein the D2D communication includes the backhaul link; and
  transmit a D2D setup message to establish a D2D link to provide communication between a first wireless device and a second wireless device via the backhaul link between the first transmission node and the second transmission node, thereby bypassing the serving gateway (SGW) for the D2D communication, wherein the first wireless device is in communication with the first transmission node, and the second wireless device is in communication with the second transmission node.

20. The transmission node of claim 19, wherein:
the transmission node configured to receive the traffic flow optimization message is further configured to receive a direct mode S1-application protocol (S1-AP) trigger message, wherein the traffic flow optimization message includes the direct mode S1-AP trigger message; and
the transmission node configured transmit the D2D setup message to establish the D2D link is further configured to transmit a direct mode radio resource control (RRC) trigger message to the first wireless device, wherein the D2D setup message includes the direct mode radio RRC trigger message, the direct mode RRC trigger message instructs the first wireless device to establish a direct D2D link between the first wireless device and the second wireless device, thereby bypassing the serving gateway (SGW) and the transmission node for the D2D communication.

21. The transmission node of claim 19, further configured to:
receive a bearer release message from the SGW, wherein the bearer release message instructs the transmission node to cease use of a network link via the SGW for the D2D communication.

22. The transmission node of claim 19, wherein the transmission node is selected from a group consisting of an evolved Node B (eNodeB), a base station (BS), a base band unit (BBU), a wireless access point (WAP), and combinations thereof.

23. The transmission node of claim 19, wherein the D2D setup message to establish the D2D link further includes instructions to establish the D2D link between the first wireless device and the second wireless device over at least one of a licensed band and an unlicensed band.

24. The transmission node of claim 19, wherein the wireless network is selected from the group consisting of an operator network, a licensed band network, an unlicensed band network, a wireless wide area network (WWAN), a wireless local area network (WLAN), a wireless personal area network (WPAN), and combinations thereof.

25. The transmission node of claim 19, wherein the first wireless device and the second wireless device are selected from the group consisting of a user equipment (UE) and a mobile station (MS), wherein the wireless devices are configured to connect to an operator network, a licensed band network, an unlicensed band network, a wireless wide area network (WWAN), a wireless local area network (WLAN), or a wireless personal area network (WPAN), and wherein the wireless devices includes an antenna, a touch sensitive display screen, a speaker, a microphone, a graphics processor, an application processor, internal memory, a non-volatile memory port, or combinations thereof.

26. A mobility management entity (MME) node for enabling device-to-device (D2D) communication in a wireless network configured to:
receive a traffic flow optimization message from a detection function (DF) module, wherein the DF module is stored in a digital memory device or is implemented in a hardware circuit;
establish a backhaul link between the first transmission node and a second transmission node in the wireless network, wherein the D2D communication includes the backhaul link; and
"transmit the traffic flow optimization message to a first transmission node in the wireless network, wherein the traffic flow optimization message initiates a setup of a D2D link between a first wireless device and a second wireless device via the backhaul link between the first transmission node and the second transmission node, thereby bypassing the serving gateway (SGW) for the D2D communication, wherein the first wireless device is in communication with the first transmission node, and the second wireless device is in communication with the second transmission node.

27. The MME node of claim 26, further configured to:
transmit a direct mode non-access stratum (NAS) message to the first wireless device, wherein the direct mode NAS message provides an initialization message for a D2D link to the first wireless device through the direct mode NAS layer; and
transmit a direct mode S1-application protocol (S1-AP) trigger message, wherein the traffic flow optimization message includes the direct mode S1-AP message, and the direct mode S1-AP message provides an initialization message to the first transmission node to setup a D2D link via an S1 interface;
wherein the direct mode NAS message and the direct mode S1-AP message instruct the first wireless device to establish a direct D2D link between the first wireless device and the second wireless device, thereby bypassing the serving gateway (SGW) and the transmission nodes for the D2D communication.

* * * * *